US011347866B2

(12) United States Patent
Gourisetti et al.

(10) Patent No.: US 11,347,866 B2
(45) Date of Patent: May 31, 2022

(54) CYBERSECURITY ASSESSMENT AND RISK MANAGEMENT TOOL

(71) Applicant: Battelle Memorial Institute, Richland, WA (US)

(72) Inventors: Sri Nikhil Gupta Gourisetti, Richland, WA (US); Michael E. Mylrea, Alexandria, VA (US); Paul M. Skare, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 368 days.

(21) Appl. No.: 16/780,672

(22) Filed: Feb. 3, 2020

(65) Prior Publication Data
US 2020/0250317 A1 Aug. 6, 2020

Related U.S. Application Data

(60) Provisional application No. 62/800,701, filed on Feb. 4, 2019.

(51) Int. Cl.
*G06F 21/57* (2013.01)
*H04L 9/40* (2022.01)

(52) U.S. Cl.
CPC ...... *G06F 21/577* (2013.01); *G06F 2221/034* (2013.01); *H04L 63/1433* (2013.01)

(58) Field of Classification Search
None
See application file for complete search history.

(56) References Cited

U.S. PATENT DOCUMENTS

| 8,256,004 | B1* | 8/2012 | Hill | G06Q 10/00 726/28 |
| 8,516,594 | B2* | 8/2013 | Bennett | G06F 21/577 713/188 |
| 9,294,495 | B1* | 3/2016 | Francoeur | H04L 63/1433 |
| 9,426,169 | B2* | 8/2016 | Zandani | G06F 21/57 |

(Continued)

OTHER PUBLICATIONS

"Buildings Cybersecurity Capability Maturity Model(B-C2M2)", Retrieved at: https://bc2m2.pnnl.gov—on Aug. 9, 2021, 1 page.
(Continued)

*Primary Examiner* — Fatoumata Traore
(74) *Attorney, Agent, or Firm* — Colby Nipper PLLC

(57) ABSTRACT

Techniques and apparatuses are described for a cybersecurity risk management tool to assess cybersecurity risk and prioritize cybersecurity correction plans. The cybersecurity risk management tool categorizes cybersecurity framework security controls into maturity indicator levels, identifies implementation states achieved by an entity with respect to the cybersecurity framework security controls, and determines which of the maturity indicator levels represents the implementation state achieved by the entity with respect to each of the cybersecurity framework security controls. A cost-benefit analysis for modifying from the implementation state achieved by the entity to a next implementation state to be achieved by the entity with respect to the cybersecurity framework security controls is also enabled. The cost-benefit analysis leverages factored weights including aspects indicative of security perspectives, Gaussian distributions, and the maturity indicator levels.

20 Claims, 16 Drawing Sheets

(56) References Cited

U.S. PATENT DOCUMENTS

2004/0010709 A1* 1/2004 Baudoin .............. G06Q 40/08
                                                      726/1
2014/0143879 A1* 5/2014 Milman .............. G06F 21/577
                                                      726/25

OTHER PUBLICATIONS

"Critical Infrastructure Sectors", Retrieved at: https://www.cisa.gov/critical-infrastructure-sectors—on Aug. 9, 2021, 3 pages.
"Data Protection—Actions Taken by Equifax and Federal Agencies in Response to the 2017 Breach", Report to Congressional Requesters, Aug. 2018, 40 pages.
"Electricity Subsector Cybersecurity Capability Maturity Model (ES-C2M2)", Version 1.1, Feb. 2014, 89 pages.
"Executive Order on Strengthening the Cybersecurity of Federal Networks and Critical Infrastructure", Retrieved at https://www.cisa.gov/executive-order-strengthening-cybersecurity-federal-networks-and-critical-infrastructure—on Aug. 9, 2021, 5 pages.
"Framework for Improving Critical Infrastructure Cybersecurity", National Institute of Standards and Technology—Version 1.1, Apr. 16, 2018, 55 pages.
"MITRE ATT&Ck Navigator", Retrieved at: https://mitre-attack.github.io/attack-navigator/—on Aug. 9, 2021, 1 pages.
"National Vulnerability Database—NVD", Retrieved at: https://nvd.nist.gov/vuln/detail/CVE-2017-5638—on Aug. 12, 2021, 5 pages.
Glantz, "Evaluating the Maturity of Cybersecurity Programs for Building Control Systems", Aug. 29, 2016, 12 pages.
Gubbi, et al., "Internet of Things (IoT): A vision, architectural elements, and future directions", Sep. 2013, pp. 1645-1660.

* cited by examiner

| NIST Cybersecurity Framework Security Controls -- Table 2A |||
|---|---|---|
| Function (Domain) | Category (Subdomain) | Subcategory |
| IDENTIFY (ID) | Asset Management (ID.AM): The data, personnel, devices, systems, and facilities that enable the organization to achieve business purposes are identified and managed consistent with their relative importance to business objectives and the organization's risk strategy. | ID.AM-1: Physical devices and systems within the organization are inventoried |
| | | ID.AM-2: Software platforms and applications within the organization are inventoried |
| | | ID.AM-3: Organizational communication and data flows are mapped |
| | | ID.AM-4: External information systems are catalogued |
| | | ID.AM-5: Resources (e.g., hardware, devices, data, and software) are prioritized based on their classification, criticality, and business value |
| | | ID.AM-6: Cybersecurity roles and responsibilities for the entire workforce and third-party stakeholders (e.g., suppliers, customers, partners) are established |
| | Business Environment (ID.BE): The organization's mission, objectives, stakeholders, and activities are understood and prioritized; this information is used to inform cybersecurity roles, responsibilities, and risk management decisions. | ID.BE-1: The organization's role in the supply chain is identified and communicated |
| | | ID.BE-2: The organization's place in critical infrastructure and its industry sector is identified and communicated |
| | | ID.BE-3: Priorities for organizational mission, objectives, and activities are established and communicated |
| | | ID.BE-4: Dependencies and critical functions for delivery of critical services are established |
| | | ID.BE-5: Resilience requirements to support delivery of critical services are established |
| | Governance (ID.GV): The policies, procedures, and processes to manage and monitor the organization's regulatory, legal, risk, environmental, and operational requirements are understood and inform the management of cybersecurity risk. | ID.GV-1: Organizational information security policy is established |
| | | ID.GV-2: Information security roles & responsibilities are coordinated and aligned with internal roles and external partners |
| | | ID.GV-3: Legal and regulatory requirements regarding cybersecurity, including privacy and civil liberties obligations, are understood and managed |
| | | ID.GV-4: Governance and risk management processes address cybersecurity risks |
| | Risk Assessment (ID.RA): The organization understands the cybersecurity risk to organizational operations (including mission, functions, image, or reputation), organizational assets, and individuals. | ID.RA-1: Asset vulnerabilities are identified and documented |
| | | ID.RA-2: Threat and vulnerability information is received from information sharing forums and sources |
| | | ID.RA-3: Threats, both internal and external, are identified and documented |
| | | ID.RA-4: Potential business impacts and likelihoods are identified |
| | | ID.RA-5: Threats, vulnerabilities, likelihoods, and impacts are used to determine risk |
| | | ID.RA-6: Risk responses are identified and prioritized |
| | Risk Management Strategy (ID.RM): The organization's priorities, constraints, risk tolerances, and assumptions are established and used to support operational risk decisions. | ID.RM-1: Risk management processes are established, managed, and agreed to by organizational stakeholders |
| | | ID.RM-2: Organizational risk tolerance is determined and clearly expressed |
| | | ID.RM-3: The organization's determination of risk tolerance is informed by its role in critical infrastructure and sector specific risk analysis |

Fig. 2A

| NIST Cybersecurity Framework Security Controls -- Table 2B |||
|---|---|---|
| Function (Domain) | Category (Subdomain) | Subcategory |
| PROTECT (PR) | Access Control (PR.AC): Access to assets and associated facilities is limited to authorized users, processes, or devices, and to authorized activities and transactions. | PR.AC-1: Identities and credentials are managed for authorized devices and users |
| | | PR.AC-2: Physical access to assets is managed and protected |
| | | PR.AC-3: Remote access is managed |
| | | PR.AC-4: Access permissions are managed, incorporating the principles of least privilege and separation of duties |
| | | PR.AC-5: Network integrity is protected, incorporating network segregation where appropriate |
| | Awareness and Training (PR.AT): The organization's personnel and partners are provided cybersecurity awareness education and are adequately trained to perform their information security-related duties and responsibilities consistent with related policies, procedures, and agreements. | PR.AT-1: All users are informed and trained |
| | | PR.AT-2: Privileged users understand roles & responsibilities |
| | | PR.AT-3: Third-party stakeholders (e.g., suppliers, customers, partners) understand roles & responsibilities |
| | | PR.AT-4: Senior executives understand roles & responsibilities |
| | | PR.AT-5: Physical and information security personnel understand roles & responsibilities |
| | Data Security (PR.DS): Information and records (data) are managed consistent with the organization's risk strategy to protect the confidentiality, integrity, and availability of information. | PR.DS-1: Data-at-rest is protected |
| | | PR.DS-2: Data-in-transit is protected |
| | | PR.DS-3: Assets are formally managed throughout removal, transfers, and disposition |
| | | PR.DS-4: Adequate capacity to ensure availability is maintained |
| | | PR.DS-5: Protections against data leaks are implemented |
| | | PR.DS-6: Integrity checking mechanisms are used to verify software, firmware, and information integrity |
| | | PR.DS-7: The development and testing environment(s) are separate from the production environment |
| | Information Protection Processes and Procedures (PR.IP): Security policies (that address purpose, scope, roles, responsibilities, management commitment, and coordination among organizational entities), processes, and procedures are maintained and used to manage protection of information systems and assets. | PR.IP-1: A baseline configuration of information technology/industrial control systems is created and maintained |
| | | PR.IP-2: A System Development Life Cycle to manage systems is implemented |
| | | PR.IP-3: Configuration change control processes are in place |
| | | PR.IP-4: Backups of information are conducted, maintained, and tested periodically |
| | | PR.IP-5: Policy and regulations regarding the physical operating environment for organizational assets are met |
| | | PR.IP-6: Data is destroyed according to policy |
| | | PR.IP-7: Protection processes are continuously improved |
| | | PR.IP-8: Effectiveness of protection technologies is shared with appropriate parties |
| | | PR.IP-9: Response plans (Incident Response and Business Continuity) and recovery plans (Incident Recovery and Disaster Recovery) are in place and managed |
| | | PR.IP-10: Response and recovery plans are tested |
| | | PR.IP-11: Cybersecurity is included in human resources practices (e.g., deprovisioning, personnel screening) |
| | | PR.IP-12: A vulnerability management plan is developed and implemented |
| | Maintenance (PR.MA): Maintenance and repairs of industrial control and information system components is performed consistent with policies and procedures. | PR.MA-1: Maintenance and repair of organizational assets is performed and logged in a timely manner, with approved and controlled tools |
| | | PR.MA-2: Remote maintenance of organizational assets is approved, logged, and performed in a manner that prevents unauthorized access |
| | Protective Technology (PR.PT): Technical security solutions are managed to ensure the security and resilience of systems and assets, consistent with related policies, procedures, and agreements. | PR.PT-1: Audit/log records are determined, documented, implemented, and reviewed in accordance with policy |
| | | PR.PT-2: Removable media is protected and its use restricted according to policy |
| | | PR.PT-3: Access to systems and assets is controlled, incorporating the principle of least functionality |
| | | PR.PT-4: Communications and control networks are protected |

*Fig. 2B*

| NIST Cybersecurity Framework Security Controls -- Table 2C |||
|---|---|---|
| Function (Domain) | Category (Subdomain) | Subcategory |
| DETECT (DE) | Anomalies and Events (DE.AE): Anomalous activity is detected in a timely manner and the potential impact of events is understood. | DE.AE-1: A baseline of network operations and expected data flows for users and systems is established and managed |
| | | DE.AE-2: Detected events are analyzed to understand attack targets and methods |
| | | DE.AE-3: Event data are aggregated and correlated from multiple sources and sensors |
| | | DE.AE-4: Impact of events is determined |
| | | DE.AE-5: Incident alert thresholds are established |
| | Security Continuous Monitoring (DE.CM): The information system and assets are monitored at discrete intervals to identify cybersecurity events and verify the effectiveness of protective measures. | DE.CM-1: The network is monitored to detect potential cybersecurity events |
| | | DE.CM-2: The physical environment is monitored to detect potential cybersecurity events |
| | | DE.CM-3: Personnel activity is monitored to detect potential cybersecurity events |
| | | DE.CM-4: Malicious code is detected |
| | | DE.CM-5: Unauthorized mobile code is detected |
| | | DE.CM-6: External service provider activity is monitored to detect potential cybersecurity events |
| | | DE.CM-7: Monitoring for unauthorized personnel, connections, devices, and software is performed |
| | | DE.CM-8: Vulnerability scans are performed |
| | Detection Processes (DE.DP): Detection processes and procedures are maintained and tested to ensure timely and adequate awareness of anomalous events. | DE.DP-1: Roles and responsibilities for detection are well defined to ensure accountability |
| | | DE.DP-2: Detection activities comply with all applicable requirements |
| | | DE.DP-3: Detection processes are tested |
| | | DE.DP-4: Event detection information is communicated to appropriate parties |
| | | DE.DP-5: Detection processes are continuously improved |

*Fig. 2C*

| NIST Cybersecurity Framework Security Controls -- Table 2D |||
|---|---|---|
| Function (Domain) | Category (Subdomain) | Subcategory |
| RESPOND (RS) | Response Planning (RS.RP): Response | RS.RP-1: Response plan is executed during or after an event |
| | Communications (RS.CO): Response activities are coordinated with internal and external stakeholders, as appropriate, to include external support from law enforcement agencies. | RS.CO-1: Personnel know their roles and order of operations when a response is needed |
| | | RS.CO-2: Events are reported consistent with established criteria |
| | | RS.CO-3: Information is shared consistent with response plans |
| | | RS.CO-4: Coordination with stakeholders occurs consistent with response plans |
| | | RS.CO-5: Voluntary information sharing occurs with external stakeholders to achieve broader cybersecurity situational awareness |
| | Analysis (RS.AN): Analysis is conducted to ensure adequate response and support recovery activities. | RS.AN-1: Notifications from detection systems are investigated |
| | | RS.AN-2: The impact of the incident is understood |
| | | RS.AN-3: Forensics are performed |
| | | RS.AN-4: Incidents are categorized consistent with response plans |
| | Mitigation (RS.MI): Activities are performed to prevent expansion of an event, mitigate its effects, and eradicate the incident. | RS.MI-1: Incidents are contained |
| | | RS.MI-2: Incidents are mitigated |
| | | RS.MI-3: Newly identified vulnerabilities are mitigated or documented as accepted risks |
| | Improvements (RS.IM): Organizational response activities are improved by incorporating lessons learned from current and previous detection/response activities. | RS.IM-1: Response plans incorporate lessons learned |
| | | RS.IM-2: Response strategies are updated |

*Fig. 2D*

| NIST Cybersecurity Framework Security Controls -- Table 2E |||
|---|---|---|
| Function (Domain) | Category (Subdomain) | Subcategory |
| RECOVER (RC) | Recovery Planning (RC.RP): Recovery processes and procedures are executed and maintained to ensure timely restoration of systems or assets affected by cybersecurity events. | RC.RP-1: Recovery plan is executed during or after an event |
| | Improvements (RC.IM): Recovery planning and processes are improved by incorporating lessons learned into future activities. | RC.IM-1: Recovery plans incorporate lessons learned |
| | | RC.IM-2: Recovery strategies are updated |
| | Communications (RC.CO): Restoration activities are coordinated with internal and external parties, such as coordinating centers, Internet Service Providers, owners of attacking systems, victims, other CSIRTs, and vendors. | RC.CO-1: Public relations are managed |
| | | RC.CO-2: Reputation after an event is repaired |
| | | RC.CO-3: Recovery activities are communicated to internal stakeholders and executive and management teams |

*Fig. 2E*

Cybersecurity Core Assessment

Identify
- Asset Management (6)
- Business Environment (5)
- Governance (4)
- Risk Assessment (6)
- Risk Management Strategy (3)
- Supply Chain Risk Management (5)

Protect

Detect

Respond

Recover

402

Identify
Asset Management

Are physical devices and systems (e.g., networked IT/OT devices and systems) within the facility inventoried?

X — Not Implemented
✓ — Partially Implemented
✓ — Largely Implemented
✓ — Fully Implemented Continue    Back

Cybersecurity Core Assessment

Identify
- Asset Management (6)
- Business Environment (5)
- Governance (4)
- Risk Assessment (6)
- Risk Management Strategy (3)
- Supply Chain Risk Management (5)

Protect

Detect

Respond

Recover

402

Identify
Business Environment

Is the facility's role in the supply chain of critical cyber assets identified and communicated?

X — Not Implemented
✓ — Partially Implemented
✓ — Largely Implemented
✓ — Fully Implemented Continue    Back

CYBERSECURITY ASSESSMENT AND RISK MANAGEMENT TOOL

CROSS-REFERENCE TO RELATED APPLICATIONS

This application claims the benefit of U.S. Provisional Appl. No. 62/800,701, filed Feb. 4, 2019, the disclosure of which is incorporated herein by reference.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

BACKGROUND

With the increased movement of many computing systems, assets, and functions to Internet-connected locations and facilities, and a growing interconnectedness between such systems, assets, and functions, increasing cybersecurity has become a priority for businesses and governments. For example, numerous governmental bodies, including the United States Department of Defense (DOD), the United States Department of Energy (DOE), the National Institute of Standards and Technology (NIST), and other organizations, have produced thousands of pages of standards and associated cybersecurity policy documents. As such, facility operators, businesses, and governments are overwhelmed on how to properly and effectively implement and improve cybersecurity.

SUMMARY

This document describes example techniques and apparatuses of a cybersecurity risk management tool for assessing cybersecurity risk and prioritizing cybersecurity correction plans. In some aspects, the cybersecurity risk management tool categorizes cybersecurity framework security controls into maturity indicator levels, identifies implementation states achieved by an entity with respect to the cybersecurity framework security controls, and determines which of the maturity indicator levels represents the implementation state achieved by the entity with respect to the cybersecurity framework security controls.

In other aspects, the cybersecurity risk management tool determines a cost-benefit analysis for modifying from the implementation state achieved by the entity to a next implementation state to be achieved by the entity with respect to the cybersecurity framework security controls. The cost-benefit analysis leverages factored weights, including aspects indicative of cybersecurity perspectives, Gaussian distributions, and the maturity indicator levels.

Additional understanding of the techniques and apparatuses contemplated and/or claimed by the inventor(s) can be gained by reviewing the detailed description of exemplary devices and methods, presented below, and the referenced drawings.

BRIEF DESCRIPTION OF THE DRAWINGS

Examples of a method and system for managing cybersecurity will now be described with reference to the accompanying drawings. Throughout the drawings, identical reference numbers designate similar, but not necessarily identical, elements.

FIG. 2A is a table identifying example NIST cybersecurity framework security controls for a first domain.

FIG. 2B is a table identifying example NIST cybersecurity framework security controls for a second domain.

FIG. 2C is a table identifying example NIST cybersecurity framework security controls for a third domain.

FIG. 2D is a table identifying example NIST cybersecurity framework security controls for a fourth domain.

FIG. 2E is a table identifying example NIST cybersecurity framework security controls for a fifth domain.

FIG. 4A depicts a user interface displaying a first example cybersecurity core assessment snapshot.

FIG. 4B depicts a user interface displaying a second example cybersecurity core assessment snapshot.

DETAILED DESCRIPTION

Figure 1A:
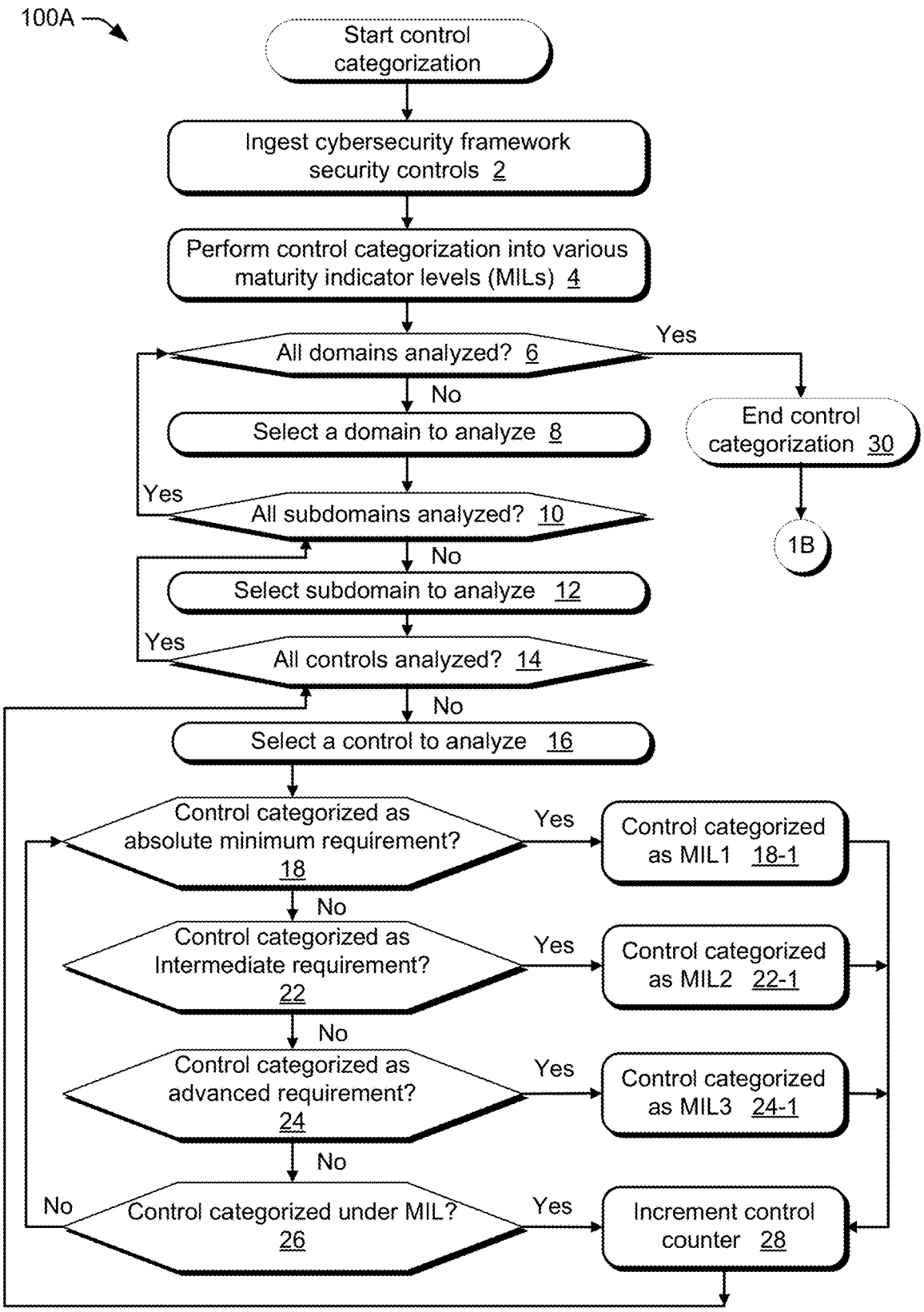
FIG. 1A is a flow chart illustrating a method for obtaining and categorizing cybersecurity framework security controls into maturity indicator levels.

This disclosure describes apparatuses and techniques for managing cybersecurity aspects of an entity. For purposes of this discussion, an entity is any person, business, organization, governmental body, facility, building, or structure that employs cybersecurity measures for its computing systems infrastructure (e.g., systems and assets). In one aspect, the apparatuses and techniques include a cybersecurity vulnerability assessment tool and a cybersecurity vulnerability correction tool. These cybersecurity tools (referred to herein collectively as the "cybersecurity tool") assist in training as well as assessing and improving the ability to identify, protect, detect, respond, and recover from cyber threats and vulnerabilities to infrastructure. In another aspect, the apparatuses and techniques of this disclosure assist in implementing Presidential Executive Order 13800 on strengthening the cybersecurity of federal networks and critical infrastructure (Exec. Order No. 13800, 82 FR 22391 (2017)).

The cybersecurity tool of this disclosure not only assesses cybersecurity risk but also prioritizes cybersecurity correction plans given some amount of resources. The term "credits" will be used in this disclosure to generally refer to some allocation of resources, financial or otherwise, used for addressing and correcting cybersecurity vulnerabilities of an entity.

In one aspect, the functions of the cybersecurity tool (e.g., to identify, protect, detect, respond, and recover from cyber threats and vulnerabilities) provide a detailed picture and measurement of an entity's cybersecurity posture. It also provides a set of cybersecurity best practices, policies, and procedures to improve the cybersecurity posture. This cybersecurity posture reflects cybersecurity gaps, areas for improvement, and a cybersecurity lifecycle perspective of an entity. This strategic view of the lifecycle and posture of an entity's cybersecurity risk management provides a qualitative and quantitative basis for efficient cyber security investment decisions. It identifies security areas that can be closed in the absence of new resources, as well as medium- and long-term opportunities to increase the overall security posture of the entity with allocated resources.

In other aspects, the cybersecurity tool provides a common taxonomy and methodology for an entity to (i) distill down industry and government best cybersecurity practices, (ii) implement Executive Order 13800 and other related security requirements, (iii) describe a current cybersecurity posture or implementation state in a way that quantifies different levels of maturity, (iv) describe a target state for cybersecurity, (v) identify, measure, and prioritize opportunities for improvement within the context of a continuous and repeatable process, (vi) assess progress toward the target state, (vii) help communicate among internal and external stakeholders about cybersecurity risk, and (viii) train stakeholders on cybersecurity best practices.

The operations of methods described herein may be embodied as programming instructions stored on a non-transitory, machine-readable (e.g., computer/processor-readable) medium, such as a random access memory (RAM), read-only memory (ROM), flash memory, cache memory, solid-state drive (SSD), hard disk drive (HDD), or combinations thereof, for execution in a computing device or devices. In some examples, implementing the operations of such methods can be achieved by a processor reading and executing the programming instructions stored in the memory. In other examples, implementing the operations of the methods can be achieved using an application-specific integrated circuit (ASIC) and/or other hardware components alone or in combination with programming instructions executable by a processor in a computing device or devices.

The example methods may include more than one implementation, and different implementations of the methods may not employ every operation presented in a respective flow diagram or may employ additional steps not shown in the respective diagram. Therefore, while the operations of the methods are presented in a particular order within the flow diagrams, the order of their presentations is not intended to be a limitation as to the order in which the operations may actually be implemented, or as to whether all of the operations may be implemented. For example, one implementation of a method might be achieved through the performance of a number of initial operations without performing one or more subsequent operations, while another implementation of the method might be achieved through the performance of all of the operations.

FIGS. 1A-1D depict example methods of managing cybersecurity by assessing a general cybersecurity posture (e.g., cybersecurity risk) of an entity and identifying a cybersecurity vulnerability of the entity relative to identified cybersecurity framework security controls. These cybersecurity framework security controls may be any set of standards, guidelines, and practices to promote the protection of, and to reduce cyber risks to, infrastructure.

An example of cybersecurity framework security controls is the U.S. National Institute of Standards and Technology (NIST) Cybersecurity Framework core. This NIST core is a set of cybersecurity activities, desired outcomes, and applicable references that are common across critical infrastructure sectors. The core includes five concurrent and continuous Functions—Identify, Protect, Detect, Respond, and Recover, as follows:

Identify—Develop an organizational understanding to manage cybersecurity risk to systems, people, assets, data, and capabilities;

Protect—Develop and implement appropriate safeguards to ensure the delivery of critical services;

Detect—Develop and implement appropriate activities to identify the occurrence of a cybersecurity event;

Respond—Develop and implement appropriate activities to take action regarding a detected cybersecurity incident; and Recover—Develop and implement appropriate activities to maintain plans for resilience and to restore any capabilities or services that were impaired due to a cybersecurity incident.

The NIST core also identifies underlying key Categories and Subcategories—which are discrete outcomes—for each Function. FIGS. 2A-D depict tables 2A-D showing the NIST core Functions, Categories, and Subcategories. For purposes of this disclosure, cybersecurity framework security controls refer to any cyber aspects defined to promote the protection of, and to reduce cyber risks to, infrastructure. The NIST core Functions, Categories, and Subcategories in Tables 2A-D are merely an example of cybersecurity framework security controls usable with the cybersecurity tool of this disclosure. Additionally, for purposes of this disclosure, aspects similar to the NIST core Functions will be referred to as domains, aspects similar to NIST core Categories will be referred to as subdomains, and aspects similar to NIST core Subcategories will be referred to as specific cybersecurity framework security controls. However, for purposes of this disclosure, the term cybersecurity framework security controls applies generally and collectively to domains, subdomains, and specific cybersecurity framework security controls (e.g., subcategories).

Referring now to FIG. 1A, an example method 100A is depicted for obtaining and categorizing cybersecurity framework security controls into maturity indicator levels using the cybersecurity tool in a computing system having at least one processor and a memory. At 2, cybersecurity framework security controls, such as those described in reference to the NIST core, are ingested (obtained) into the system and stored in memory. For simplicity of discussion, each cybersecurity framework security control, whether referenced from a domain, subdomain, or subcategory, will be referred to as a "control" or "security control." Thus, at 4, the process is started for categorizing each control into a respective maturity indicator level of a specified maturity model.

A maturity model is a set of characteristics, attributes, indicators, or patterns that represent capability, progression, and achievement with respect to cybersecurity practices. A maturity model provides a benchmark against which an entity can evaluate the current level of capability of its practices, processes, and methods, and set goals and priorities for improvement. The Department of Energy (DOE) developed the Cybersecurity Capability Maturity Model (C2M2). In this model, maturity indicator levels (MILs) define an approach progression, and an institutionalization progression, of maturity in the maturity model. The C2M2 uses a scale of MIL levels (0-3), each of which is a set of attributes defining that level. If an entity demonstrates these cybersecurity attributes, it has achieved both that level and the capabilities that the level represents. For purposes of this disclosure, and simplicity of discussion, maturity indicator levels 0-3 will be identified and referenced as set forth in the C2M2, although variations may also be implemented. In this context, the C2M2 maturity indicator levels are as follows:

Maturity Indicator Level 0 (MIL0)—The model contains no practices for MIL0. Performance at MIL0 simply means that MIL1 in a given domain has not been achieved.

Maturity Indicator Level 1 (MIL1)—In each domain, MIL1 contains a set of initial practices. To achieve MIL1, these initial activities may be performed in an ad hoc manner, but they must be performed. If an organization were to start with no capability in managing cybersecurity, it should focus initially on implementing the MIL1 practices.

Maturity Indicator Level 2 (MIL2)—Four management practices are present at MIL2, which represent an initial level of institutionalization of the activities within a domain:
1. Practices are documented;
2. Stakeholders of the practice are identified and involved;
3. Adequate resources are provided to support the process (people, funding, and tools); and
4. Standards and/or guidelines have been identified to guide the implementation of the practices.

Maturity Indicator Level 3 (MIL3)—At MIL3, the activities in a domain have been further institutionalized and are now being managed. Five management practices support this progression:
1. Activities are guided by policies (or other organizational directives) and governance;
2. Policies include compliance requirements for specified standards and/or guidelines;
3. Activities are periodically reviewed to ensure they conform to policy;
4. Responsibility and authority for performing the practices are assigned to personnel; and
5. Personnel performing the practices have adequate skills and knowledge.

Referring again now to method 100A, at 6, if all domains have not been analyzed with respect to the cybersecurity framework security controls, then at 8 a domain is selected (e.g., sequentially) to be analyzed. For example, the domain of "Identify" may initially be selected. At 10, if all subdomains of the selected domain have not been analyzed, then at 12 a subdomain is selected to be analyzed (e.g., sequentially). For example, the subdomain of "Asset Management" may be selected. At 14, if all controls have not been analyzed, then at 16 a control is selected (e.g., sequentially) to be analyzed.

At 18, query whether the control is categorized as an absolute minimum requirement for cybersecurity purposes. This may be determined during processing by a user interaction and input, or requires each of the controls to have been previously categorized (e.g., saved in a data file) relative to an identified level of cybersecurity implementation requirement for the entity, ranging from an absolute minimum requirement, an intermediate requirement, or an advanced requirement. If the control is categorized as an absolute minimum requirement, then at 18-1 it is also categorized as MIL1, indicative of a relevant progression of maturity.

Alternatively, at 22, if the control is categorized as an intermediate requirement for cybersecurity purposes, then at 22-1 it is categorized as MIL2. Similarly, at 24, if the control is categorized as an advanced requirement for cybersecurity purposes, then at 24-1 it is categorized as MIL3. At 26, if for some reason the control has not been categorized under a maturity indicator level, then processing returns to redo the categorization at 18. On the other hand, if the control has been categorized, then a control counter is incremented at 28 to select a next control and processing returns to determine if all the controls have been analyzed at 14 for this selected domain and subdomain. If all the controls have not been analyzed, then the overall process of selecting and analyzing controls is repeated until all the controls are categorized into appropriate maturity indicator levels. At 14, once all controls are analyzed, processing returns to repeat detecting whether all subdomains and domains are analyzed, and selecting a next domain or subdomain to process those respective controls as appropriate. At 6, if all the domains and respective subdomains and controls are categorized, then the control categorization process ends at 30.

Figure 1B:
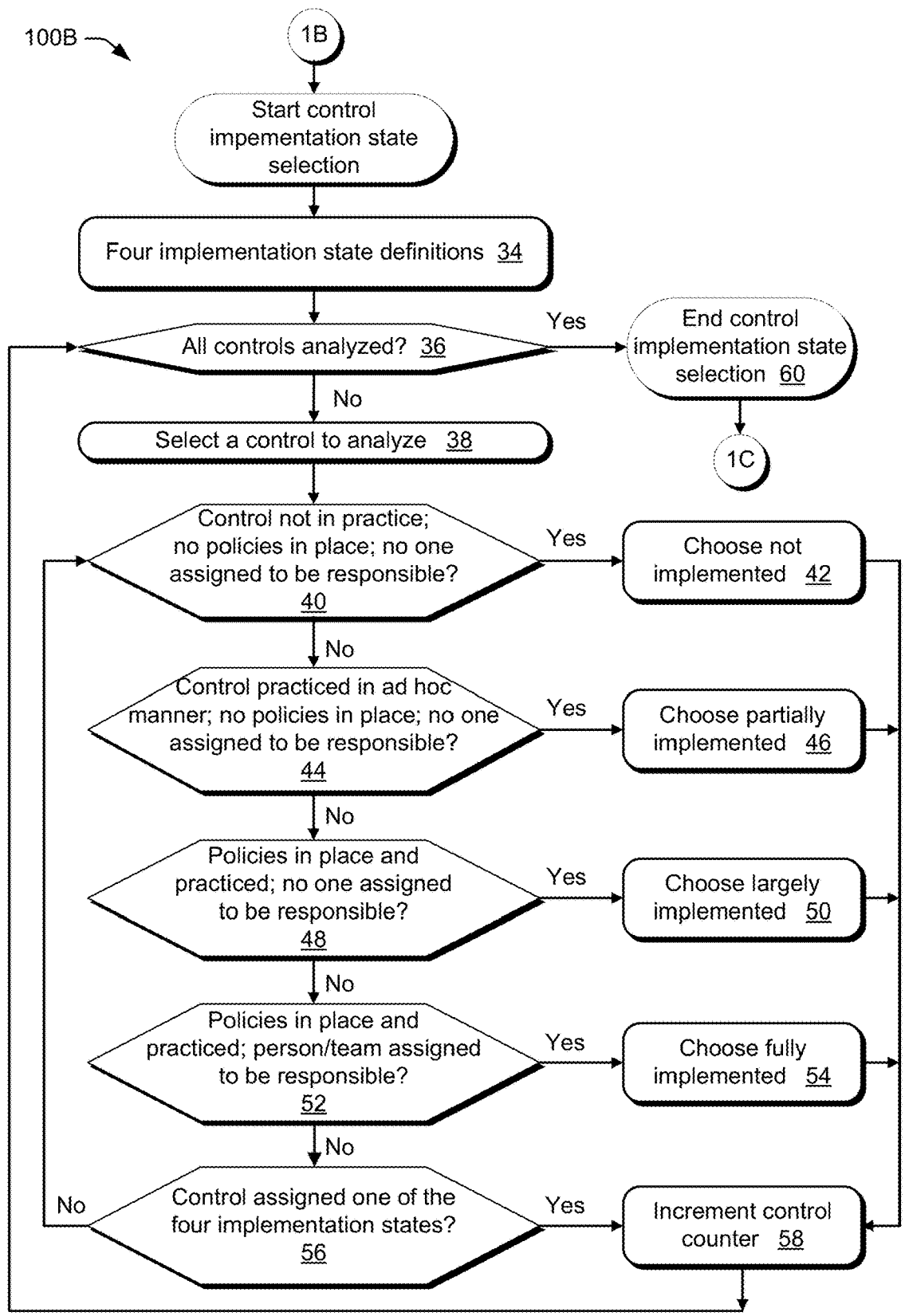
FIG. 1B is a flow chart illustrating a method for identifying an implementation state achieved by an entity with respect to cybersecurity framework security controls.

FIG. 1B is an example method 100B illustrating a method for identifying a cybersecurity implementation state achieved by an entity with respect to the referenced cybersecurity framework security controls. At 34, it is noted that four cybersecurity implementation states are defined in this example. These implementation states identify cybersecurity posture reference points for the entity. One implementation state is designated for each control identified. The criteria considered to determine whether an implementation state is met may be flexible according to business and security needs. In one example, the criteria may be similar to maturity indicator level criteria, although other criteria may similarly be considered.

At 36 if all the controls are not analyzed, then at 38 a next control is selected (e.g., sequentially) to be analyzed. At 40, if a control is not in practice, and no security policies are in place, and no one is assigned to be responsible for implementing the control, then at 42 the implementation state is designated as not implemented for the entity. On the other hand, at 44, if the control is practiced in an ad hoc manner, but no policies are in place, and no one is assigned to be responsible, then at 46 the implementation state is designated as partially implemented. At 48, if policies are in place and practiced, but no one is assigned to be responsible, then at 50 the implementation state is designated as largely implemented. At 52, if policies are in place and practiced per the policies, and a person or team is assigned to be responsible, then at 54 the implementation state is designated as fully implemented.

At 56, if for some reason the control has not been designated an implementation state, then processing returns to redo the designation process at 40. On the other hand, if the control has been designated an implementation state, then a control counter is incremented at 58 to identify a next control and processing returns to determine if all the controls have been analyzed at 36. Although method 100B does not depict the concept of processing controls within each domain and subdomain, for simplicity of drawing purposes, the same concept of processing the controls in each domain and subdomain applies for method 100B similar to as depicted in method 100A. Consequently, at 36, if all the controls have not been analyzed, then the overall process of analyzing controls is repeated until all the controls in all the subdomains and domains are designated into appropriate implementation states. At 36, if all the controls are categorized (including for all domains and subdomains), then the control implementation state selection process ends at 60.

Figure 1C:
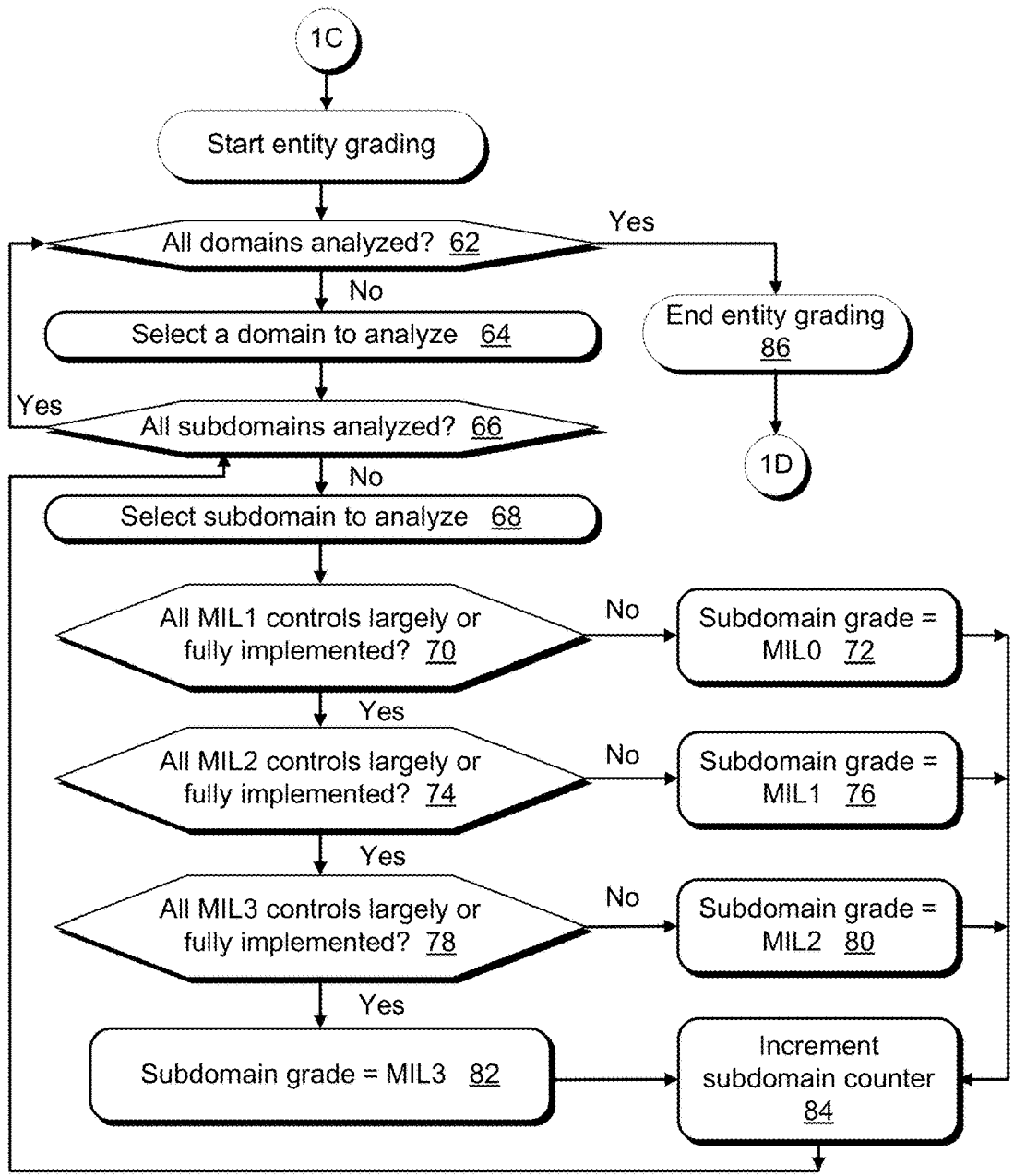
FIG. 1C is a flow chart illustrating a method for determining which maturity indicator level represents the implementation state achieved by an entity with respect to each of the cybersecurity framework security controls.

FIG. 1C is a flow chart illustrating a method for determining which maturity indicator level represents the implementation state achieved by the entity with respect to each of the cybersecurity framework security controls. This represents an entity grading perspective and identifies another cybersecurity posture reference point for the entity.

At 62, if all domains have not been analyzed, then at 64 a domain is selected to be analyzed. At 66, if all subdomains have not been analyzed, then at 68 a subdomain is selected to be analyzed. At 70, if all MIL1 controls are not largely or fully implemented (see methods 100A-B), then at 72 the subdomain is graded as MIL0. On the other hand, if all MIL1 controls are largely or fully implemented, then at 74 whether all MIL2 controls are largely or fully implemented is queried. If not, then at 76 the subdomain is graded as MIL1.

If all MIL2 controls are largely or fully implemented, then at 78 whether all MIL3 controls are largely or fully implemented is queried. If not, then at 80 the subdomain is graded as MIL2. Finally, if all MIL3 controls are largely or fully implemented, then at 82 the subdomain is graded at MIL3. In this instance, the subdomain counter is incremented at 84 to select the next subdomain, and the process is repeated until all controls in all subdomains at 66 and all domains at 62 are analyzed. Once all the controls in all the domains are analyzed at 62, then the process of grading the entity ends at 86.

Figure 1D:
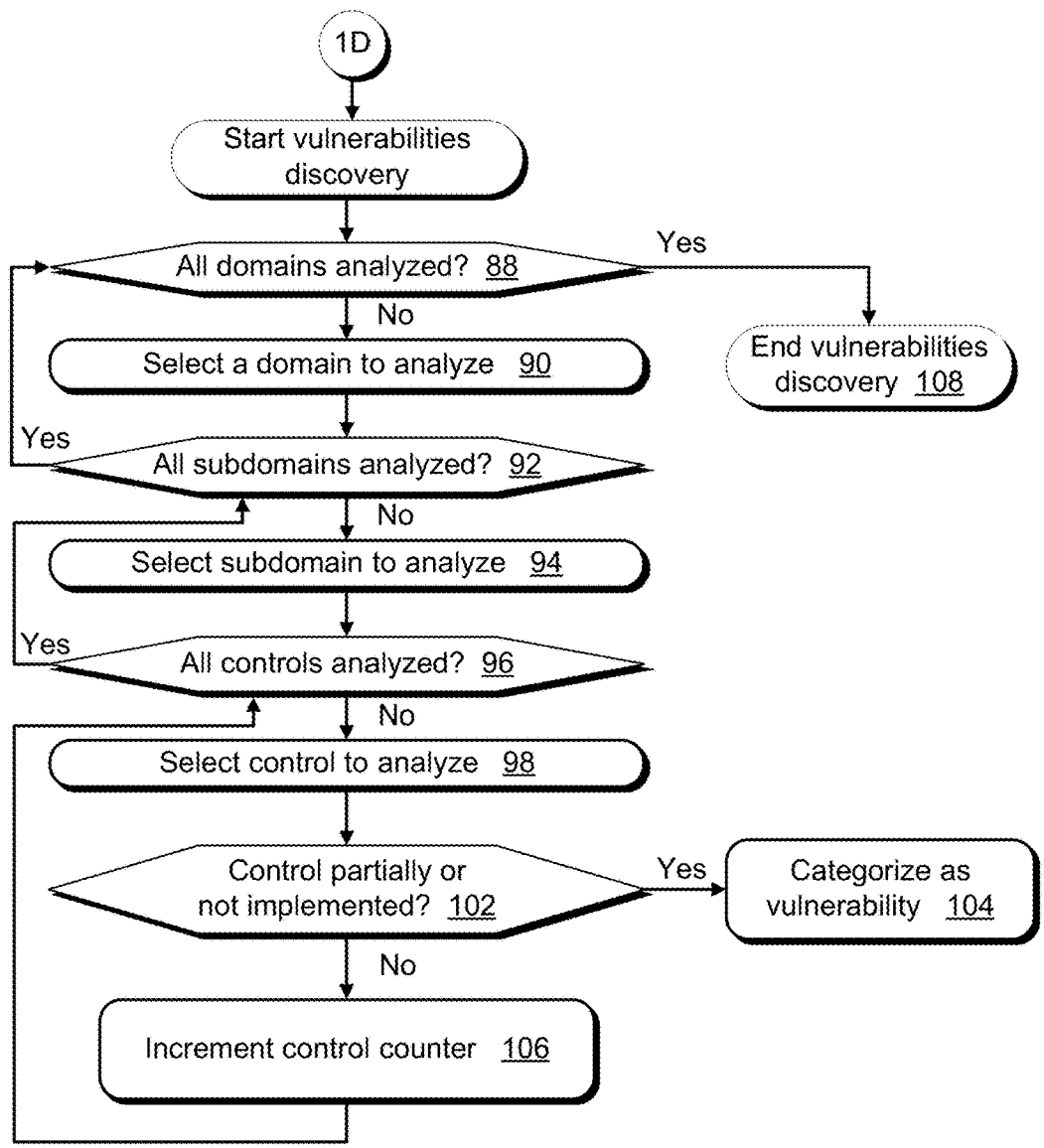
FIG. 1D is a flow chart illustrating a method for identifying a cybersecurity vulnerability of an entity.

FIG. 1D is a flow chart illustrating a method for identifying a cybersecurity vulnerability of an entity—another cybersecurity posture reference point. At 88, if all domains have not been analyzed, then at 90 a domain is selected to be analyzed. At 92, if all subdomains have not been analyzed, then at 94 a subdomain is selected to be analyzed. At 96, if all controls have not been analyzed, then at 98 a control is selected to be analyzed. At 102, if the control is partially or not implemented, then at 104 it is categorized as a vulnerability of the entity. The vulnerability may be reported, and the entity may then consider appropriate action to address the vulnerability.

If the control is implemented more than partially (e.g., largely or fully), then at 106 the control counter is incremented, and the process is repeated to select another control until all controls are analyzed, and all partially or non-implemented controls are categorized as a vulnerability, including for all subdomains and domains. When all controls are analyzed at 96, under all subdomains at 92 and all domains at 88, then the process of discovering vulnerabilities ends at 108.

Figure 3A:
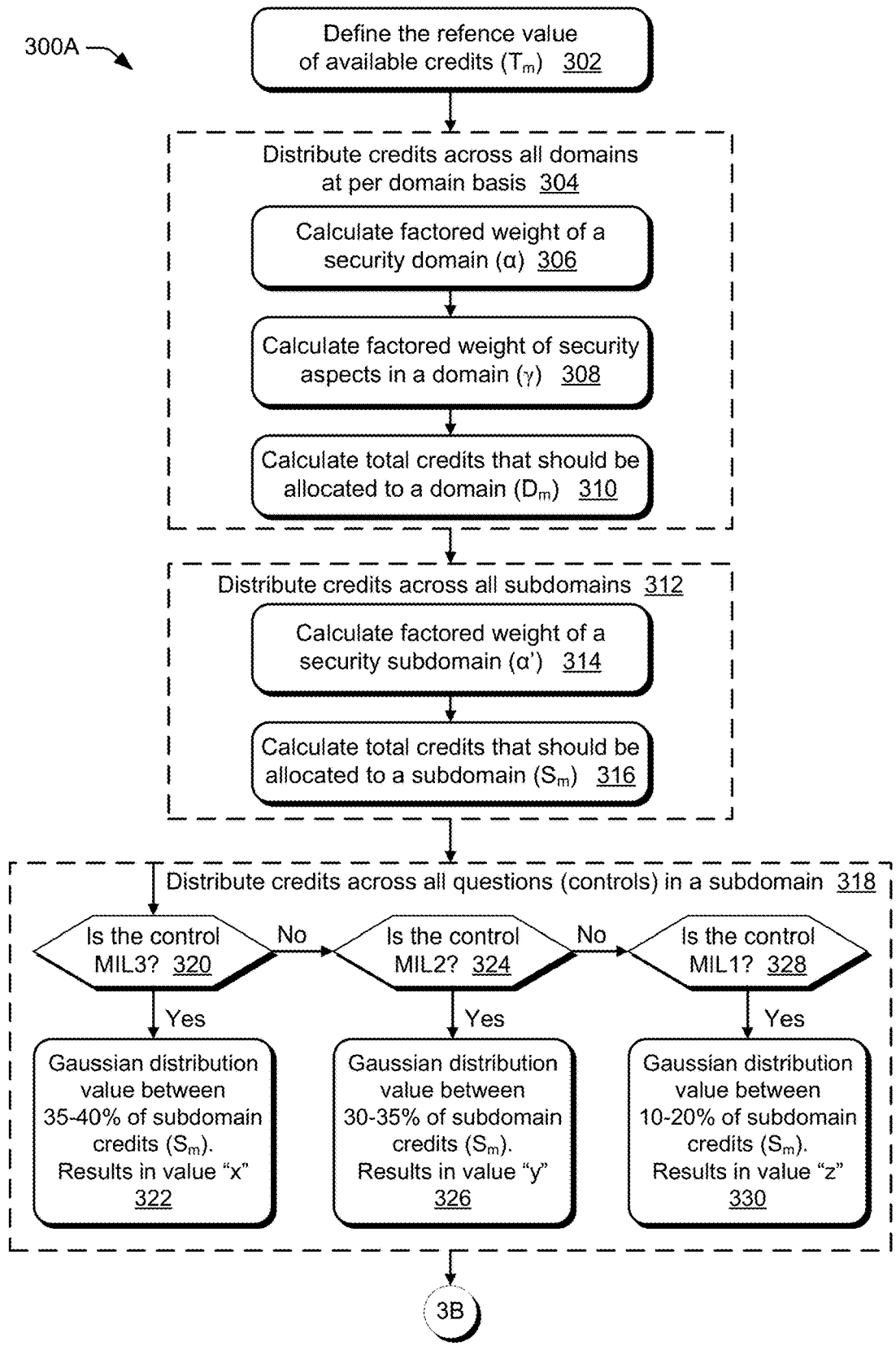
FIG. 3A is a flow chart illustrating a first sequence of steps for an example method of performing a cost-benefit analysis, using factored weights, for modifying cybersecurity implementation states of an entity.
Figure 3B:
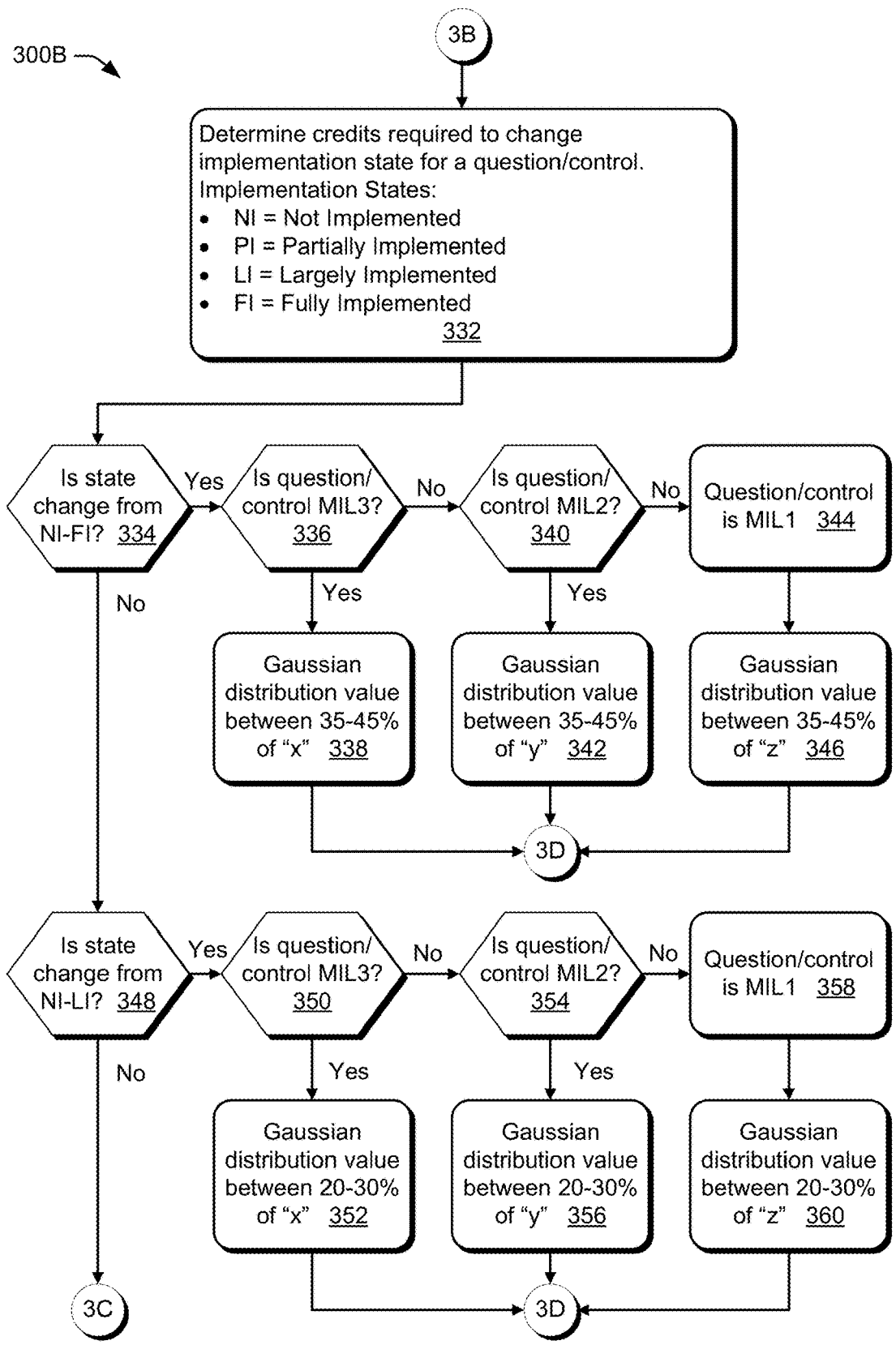
FIG. 3B is a flow chart illustrating a second sequence of steps for the example method of performing a cost-benefit analysis, using factored weights, for modifying cybersecurity implementation states of an entity.
Figure 3C:
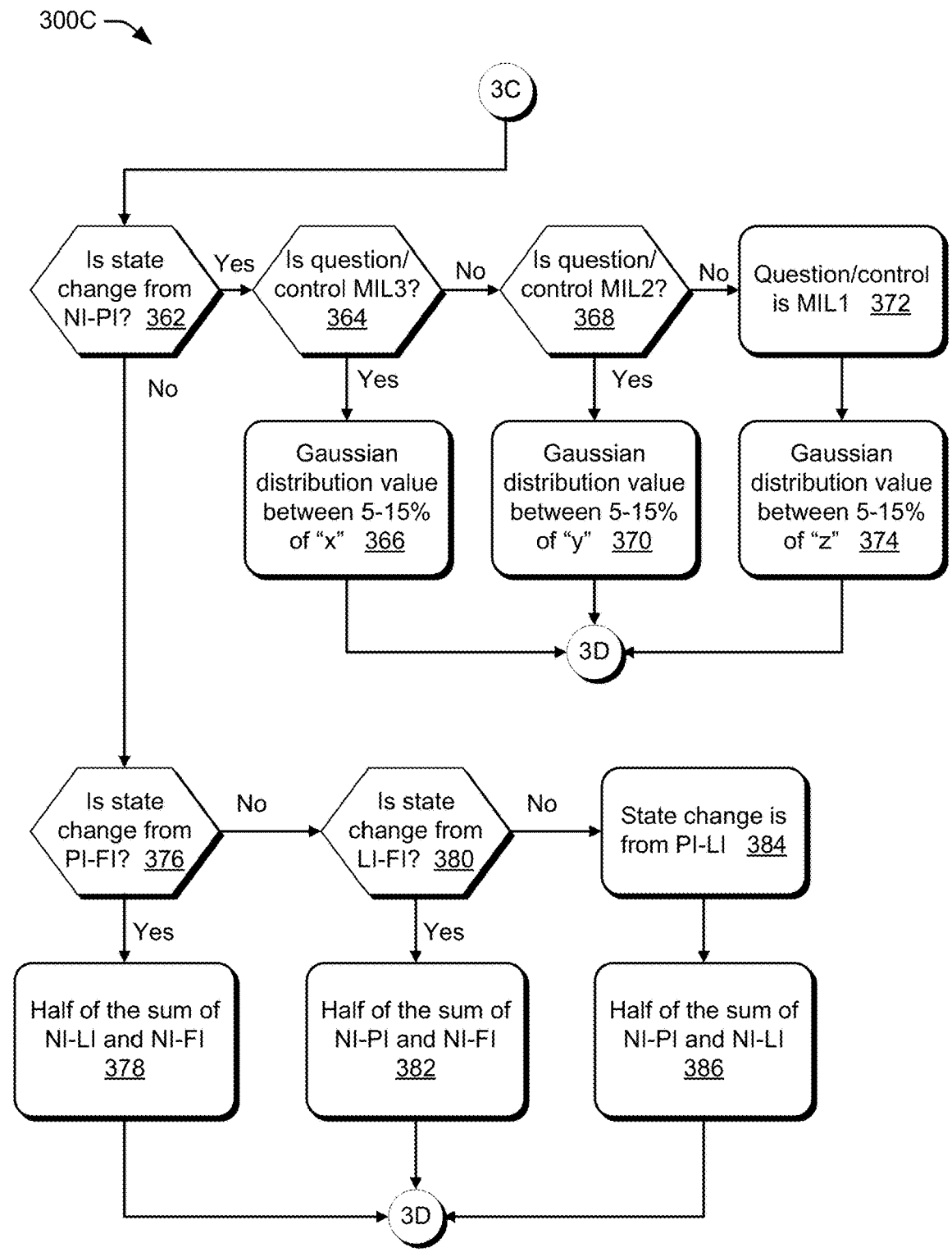
FIG. 3C is a flow chart illustrating a third sequence of steps for the example method of performing a cost-benefit analysis, using factored weights, for modifying cybersecurity implementation states of an entity.
Figure 3D:
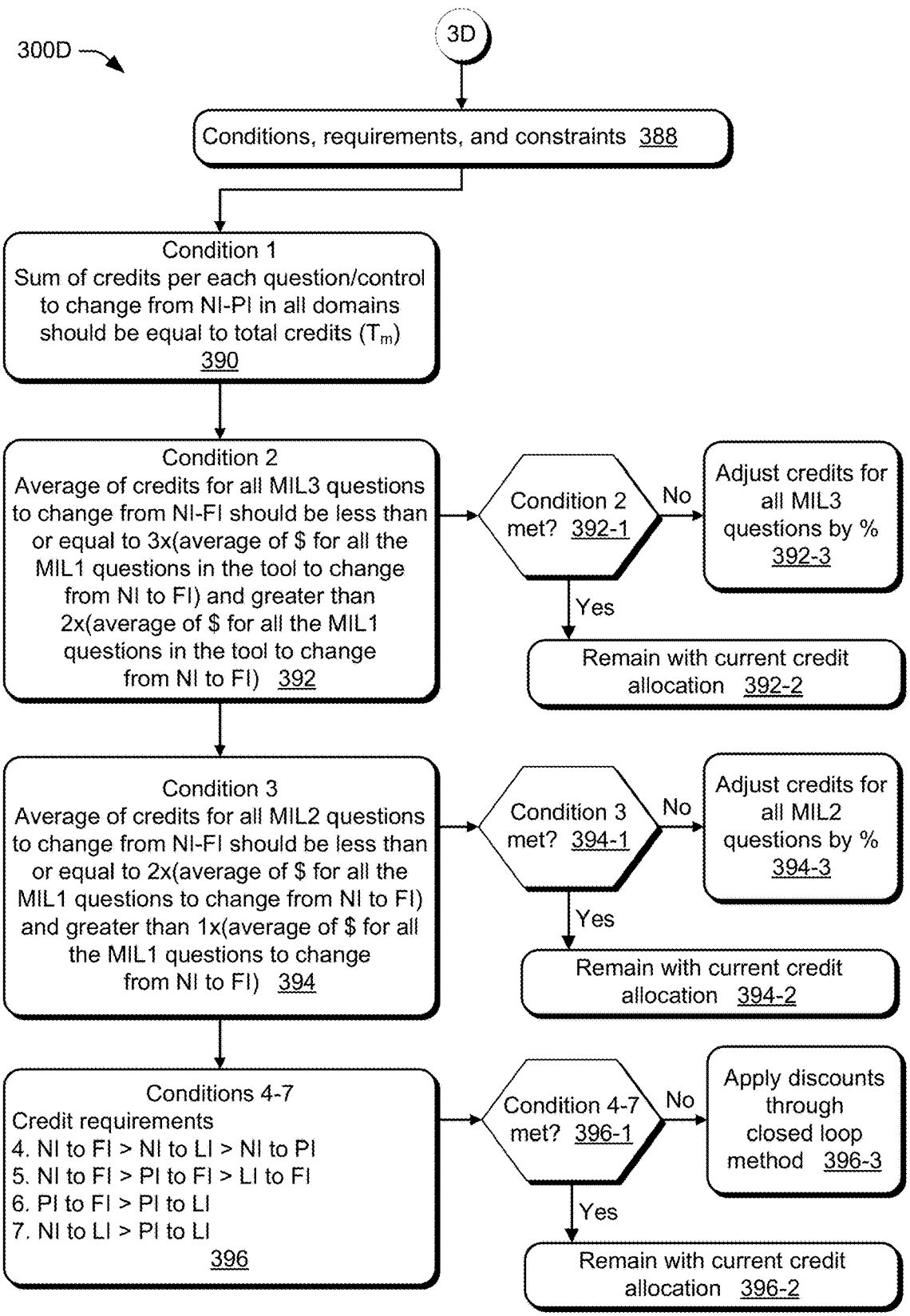
FIG. 3D is a flow chart illustrating conditions, requirements, and constraints for a method of performing a cost-benefit analysis, using factored weights, for modifying cybersecurity implementation states of an entity.

FIGS. 3A-D are flow charts illustrating an example method of performing a cost-benefit analysis, using factored weights and respective conditions, requirements, and constraints, for modifying cybersecurity implementation states of an entity with respect to cybersecurity framework security controls. This method facilitates the efficient and effective allocation of cybersecurity investment money. From a high-level perspective, FIG. 3A depicts a total allocation of credits per security control question, FIG. 3B and FIG. 3C depict taking the credits calculated in FIG. 3A for each question and distributing that for each implementation state. FIG. 3D depicts the conditions, requirements, and constraints for this example method.

Referring now to FIG. 3A, method 300A, at 302 the reference value of available credits ($T_m$) is defined. This reference value may be any amount of money allocated by the entity for cybersecurity investment purposes. For purposes of this discussion, the reference value is referred to as "credits" and, as an example and for simplicity of this discussion, may be assumed to be an arbitrary default amount of one million (1,000,000) credits.

At 304, the available credits ($T_m$) are distributed across all domains on a per-domain basis. Each of the domains (five in this example) will have set credits that will be further distributed. This is accomplished first, at 306, by calculating a factored weight of a security domain ($\alpha$). Then, at 308, a factored weight of security aspects in a domain ($\gamma$) is calculated. And at 310, the total credits that should be allocated to a domain ($D_m$) are calculated.

Example formulations for this distribution of credits across domains on a per-domain basis at 304 are as follows:
$T_m$=Total credits ($) available
$D_m = T_m \times \alpha \times \gamma$; $D_m$ is the $ to be allocated to a domain
Where $$\alpha = \left(\frac{M_3^D}{M_3^T}\right) + \left(\frac{M_2^D}{M_2^T}\right) + \left(\frac{M_1^D}{M_1^T}\right);$$

$\alpha$ is the factored weight of a security domain
Where $$\gamma = \frac{3M_3^D + 2M_2^D + M_1^D}{3M_T^D};$$

$\gamma$ is the factored weight of security aspects in a domain
Therefore, $$D_m = T_m \times \left(\left(\frac{M_3^D}{M_3^T}\right) + \left(\frac{M_2^D}{M_2^T}\right) + \left(\frac{M_1^D}{M_1^T}\right)\right) \times \frac{3M_3^D + 2M_2^D + M_1^D}{3M_T^D}$$

Where
$D_T$=Total number of domains
$D_m$=Total allocatable $ for a domain
$M_3^D$=Total number of MIL3 questions in a domain
$M_2^D$=Total number of MIL2 questions in a domain
$M_1^D$=Total number of MIL1 questions in a domain
$M_3^T$=Total number of MIL3 questions in the tool
$M_2^T$=Total number of MIL2 questions in the tool
$M_1^T$=Total number of MIL1 questions in the tool
$M_T^D$=Total number of questions in a domain
Therefore,
$M_3^T = \Sigma_{D=1}^{D_T} M_3^D; M_2^T = \Sigma_{D=1}^{D_T} M_2^D; M_1^T = \Sigma_{D=1}^{D_T} M_1^D;$
$M_T^D = \Sigma_{n=1}^{3} M_n^D$ The "questions in a domain" or "questions in the tool" refer to the cybersecurity framework security controls being considered, but as formulated or tailored into questions for presenting to a user of an entity regarding the implementation of those cybersecurity framework security controls. The tailoring of the cybersecurity framework security controls into questions enables the cybersecurity tool of this disclosure to guide a user or entity through the processes and methods disclosed herein for, inter alia, assessing cybersecurity risk and prioritizing cybersecurity correction plans. In this context, there may be as many questions as there are cybersecurity framework security controls relating to a domain, subdomain, and subcategory, or some variation of those according to business and security needs.

As an example for tailoring questions, FIG. 4A depicts a sample user interface 400 displaying an example cybersecurity core assessment interface snapshot at a moment in time while the assessment is in process using the cybersecurity tool. The status of the assessment is depicted at 402, with each of the five domains identified (e.g., Identify, Protect Detect, Respond, Recover) for which questions are tailored and should be answered by a user for cybersecurity assessment purposes. The subdomains for the domain "Identify" are listed in this example (e.g., Asset Management, Business Environment, Governance, Risk Assessment, Risk Management Strategy, Supply Chain Risk Management) because the user is currently working through the "Identify" domain questions. Additionally, the subdomains depicted reveal the number of questions (e.g., controls) in parenthesis to be answered that are associated with each subdomain. For this discussion, questions relating to cybersecurity framework security controls may be referred to simply as questions, or as controls, or as questions/controls.

As shown at 404A, the user is currently answering a question relevant to the domain "Identify" and the subdomain "Asset Management." In the example depicted, the interface presents cybersecurity framework security controls subcategory ID.AM-1 (see FIG. 2A, Table 2A) as tailored into the question: "Are physical devices and systems (e.g., networked IT/OT devices and systems) within the facility inventoried?" The interface at 404A allows the user to select an appropriate answer from the soft button selections, located below the question of: not implemented, partially implemented, largely implemented, and fully implemented. Upon selecting an appropriate implementation answer, the user may continue on to the next question, or go back to the prior question, by selecting the respective soft button "continue" or "back."

FIG. 4B depicts the example user interface 400 displaying an example cybersecurity core assessment interface snapshot at a different moment in time while the assessment is in process. In this example instance, at 404B the user is currently answering a question relevant to the domain "Identify" and the subdomain "Business Environment." In the example depicted, the interface presents cybersecurity framework security controls subcategory ID.BE-1 (see FIG. 2A, Table 2A) as tailored to the question: "Is the facility's role in the supply chain of critical cyber assets identified and communicated?"

User interface 400 provides relevant cybersecurity framework security controls questions to a user for an entity and allows the user to input responses interactively. Such questions may be formulated for relevance to the processes outlined with respect to the methods discussed in FIGS. 1A-D relating to assessing a general cybersecurity posture (e.g., cybersecurity risk) of an entity and identifying a cybersecurity vulnerability of the entity relative to identified cybersecurity framework security controls, as well as the methods discussed in FIGS. 3A-D relating to performing a cost-benefit analysis for modifying a cybersecurity implementation state. The posing of these questions and receiving responses may be performed interactively while using the cybersecurity tool for real-time processing and results. Alternatively, the answers may be saved to a data file for subsequent processing by the cybersecurity tool.

Returning now to FIG. 3A, method 300A, at 312, the available credits ($T_m$) are distributed across all subdomains at a per-subdomain basis. At this point, each of the subdomains will have set credits that will be further distributed. This is accomplished first, at 314, by calculating a factored weight of a subdomain ($\alpha$). Then, at 316, the total credits that should be distributed (allocated) to a subdomain ($S_m$) are calculated.

Example formulations for this distribution of credits across all subdomains are as follows:
$D_m$=Total allocated $ to a domain
$S_m = D_m \times \alpha'$; $S_m$ is the $ to be allocated to a subdomain
Where $$\alpha' = \left(\frac{M_3^S}{M_3^D}\right) + \left(\frac{M_2^S}{M_2^D}\right) + \left(\frac{M_1^S}{M_1^D}\right);$$

$\alpha'$ is the factored weight of a security domain
Therefore, $$S_m = D_m \times \left(\left(\frac{M_3^S}{M_3^D}\right) + \left(\frac{M_2^S}{M_2^D}\right) + \left(\frac{M_1^S}{M_1^D}\right)\right)$$

Where
$S_m$=Total allocatable $ for a subdomain
$M_3^S$=Total number of MIL3 questions in a subdomain
$M_2^S$=Total number of MIL2 questions in a subdomain
$M_1^S$=Total number of MIL1 questions in a subdomain At 318, credits are distributed across all cybersecurity framework security controls (e.g., subcategories), as tailored into questions, across all subdomains. This provides a maturity improvement concept for potentially modifying from one cybersecurity implementation state to another for an improved cybersecurity posture. At 320, if the control/question is categorized as MIL3, then at 322 a Gaussian distribution value between 35-40% of subdomain credits ($S_m$) is applied, resulting in a value x. On the other hand, at 324, if the control/question is categorized as MIL2, then at 326 a Gaussian distribution value between 30-35% of subdomain credits ($S_m$) is applied, resulting in a value y. At 328, if the control/question is categorized as MIL1 then at 330 a Gaussian distribution value between 10-20% of subdomain credits ($S_m$) is applied, resulting in a value z. These percentages are example percentages and may be adjusted pursuant to business and security aspects. These Gaussian distribution values at 322, 326, and 330, are referred to generally as a first Gaussian distribution value for later reference herein.

Example criteria and formulations for this distribution of credits across all controls/questions in a subdomain for maturity improvement perspectives are as follows:
  MIL3 (x): A Gaussian random value between 35% to 40% of subdomain $ Value ($S_m$)
  MIL2 (y): A Gaussian random value between 30% to 35% of subdomain $ Value ($S_m$)
  MIL1 (z): A Gaussian random value between 10% to 20% of subdomain $ Value ($S_m$)

Referring now to FIG. 3B, method 300B, at 332, credits required to change an implementation state for a question/control are determined. As discussed, in this example, an implementation state may be: not implemented (NI), partially implemented (PI), largely implemented (LI), or fully implemented (FI) At 334, if a state change is to occur from NI to FI, then at 336 if the question/control is MIL3, then at 338 a second Gaussian distribution value between 35-45% of x is applied to determine the credits for changing the state.

The value of x is the resulting value that was obtained when the first (prior) Gaussian distribution value was applied for an MIL3 control in the subdomain (see FIG. 3A, method 300A, at 320, 322).

On the other hand, at 334, if a state change is to be from NI to FI, and at 340 if the question/control is MIL2, then at 342 a second Gaussian distribution value between 35-45% of y is applied. The value of y is the resulting value that was obtained when the first (prior) Gaussian distribution value was applied for an MIL2 control in the subdomain (see FIG. 3A, method 300A, at 324, 326). Similarly, At 334, if a state change is to be from NI to FI, then at 344 if the question/control defaults to MIL1, then at 346 a second Gaussian distribution value between 35-45% of z is applied. The value of z is the resulting value that was obtained when the first (prior) Gaussian distribution value was applied for an MIL1 control in the subdomain (see FIG. 3A, method 300A, at 328, 330).

At 348, if a state change is to occur from NI to LI, then at 350 if the question/control is MIL3, then at 352 a third Gaussian distribution value between 20-30% of x is applied to determine the credits for changing the state. The value of x is the resulting value that was obtained when the first (prior) Gaussian distribution value was applied for an MIL3 control in the subdomain (see FIG. 3A, method 300A, at 320, 322). On the other hand, at 348, if a state change is to be from NI to LI, and at 354 if the question/control is MIL2, then at 356 a third Gaussian distribution value between 20-30% of y is applied. The value of y is the resulting value that was obtained when the first (prior) Gaussian distribution value was applied for an MIL2 control in the subdomain (see FIG. 3A, method 300A, at 324, 326). Similarly, At 348, if a state change is to be from NI to LI, then at 358 if the question/control defaults to MIL1 then at 360 a third Gaussian distribution value between 20-30% of z is applied. The value of z is the resulting value that was obtained when the first (prior) Gaussian distribution value was applied for an MIL1 control in the subdomain (see FIG. 3A, method 300A, at 328, 330).

Referring now to FIG. 3C, method 300C, at 362, if a state change is to occur from NI to PI, then at 364 if the question/control is MIL3, then at 366 a fourth Gaussian distribution value between 5-15% of x is applied to determine the credits for changing the state. The value of x is the resulting value that was obtained when the first (prior) Gaussian distribution value was applied for an MIL3 control in the subdomain (see FIG. 3A, method 300A, at 320, 322). On the other hand, at 362, if a state change is to be from NI to PI, and at 368 if the question/control is MIL2, then at 370 a fourth Gaussian distribution value between 5-15% of y is applied. The value of y is the resulting value that was obtained when the first (prior) Gaussian distribution value was applied for an MIL2 control in the subdomain (see FIG. 3A, method 300A, at 324, 326). Similarly, At 362, if a state change is to be from NI to PI, and at 372 if the question/control defaults to MIL1, then at 374 a fourth Gaussian distribution value between 5-15% of z is applied. The value of z is the resulting value that was obtained when the first (prior) Gaussian distribution value was applied for an MIL1 control in the subdomain (see FIG. 3A, method 300A, at 328, 330).

At 376, if the state change is from PI to FI, then at 378 half of the sum of NI-LI and NI-FI is applied to determine the credits for changing the state. On the other hand, at 380, if the state change is from LI to FI, then at 382 half of the sum of NI-PI and NI-FI is applied. Lastly, at 384, if the state change defaults to being from PI-LI, then at 386 half of the sum of NI-PI and NI-LI is applied.

Example criteria and formulations for this distribution of credits required to change implementation states for a question/control for maturity improvement perspectives are as follows:
FOR MIL 3, 2, 1 Questions:
NI to FI: A Gaussian value between 35% to 45% of x, y, z for MIL 3, 2, 1
NI to LI: A Gaussian value between 20% to 30% of x, y, z for MIL 3, 2, 1
NI to PI: A Gaussian value between 5% to 15% of x, y, z for MIL 3, 2, 1
PI to FI: ((NI to LI)+(NI to FI))/2
LI to FI: ((NI to PI)+(NI to FI))/2
PI to LI: ((NI to PI)+(NI to LI))/2

Referring now to FIG. 3D, method 300D, at 388 example conditions, requirements, and constraints for performing the cost-benefit analysis, as described in reference to FIGS. 3A-C, are described as follows. At 390, condition 1 requires that the sum of credits, per each question/control to change from implementation state NI to PI in all domains, should be equal to the total credits allocated ($T_m$).

At 392, condition 2 requires that the average credits for all MIL3 questions to change from NI to FI should be less than or equal to:
3×(average of credits for all the MIL1 questions in the tool to change from NI to FI), and greater than
2×(average of credits for all the MIL1 questions in the tool to change from NI to FI).

At 392-1, if condition 2 is met, then at 392-2 the current credit allocation is kept. If condition 2 is not met, then at 392-3 the credits are adjusted for each question/control for all MIL3 questions by a percentage amount until the condition 2 is satisfied.

At 394, condition 3 requires that the average credits for all MIL2 questions to change from NI to FI should be less than or equal to:
2×(average of credits for all the MIL1 questions to change from NI to FI), and greater than
1×(average of credits for all the MIL1 questions to change from NI to FI).

At 394-1 if condition 3 is met, then at 394-2 the current credit allocation is kept. If condition 3 is not met, then at 394-3 the credits are adjusted for each question/control for all MIL2 questions by a percentage amount until the condition 3 is satisfied.

At 396, conditions 3-6 set forth additional credit requirements for different implementation state changes, as follows:

Condition 4: NI to FI>NI to LI>NI to PI. Meaning, the credits required to change state from NI to FI should be greater than credits required to change the state from NI to LI. And the credits required to change state from NI to LI should be greater than credits required to change the state from NI to PI.

Condition 5: NI to FI>PI to FI>LI to FI. The credits required to change state from NI to FI should be greater than credits required to change the state from PI to FI. And credits required to change state from PI to FI should be greater than credits required to change the state from LI to FI.

Condition 6: PI to FI>PI to LI. The credits required to change state from PI to FI should be greater than credits required to change the state from PI to LI.

Condition 7: NI to LI>PI to LI. The credits required to change state from NI to LI should be greater than credits required to change the state from PI to LI.

At 396-1, if any of conditions 4-7 are met, then the current credit allocation is kept for that condition. If any of these conditions is not met, then at 396-3 discounts are applied to credits for those conditions through a closed-loop method. The closed-loop method occurs by decreasing the amount of credit (e.g., money) it would take to implement MIL2 and MIL3 questions as a question/control implementation occur within a subdomain. All implementation of MIL1 questions/controls applies a 5% decrease to both MIL1 and MIL2 questions/controls within the same domain. And all implementation of MIL2 questions/controls applies a 10% decrease to MIL3 implementations. The formulation is as follows:

X=Total number of cost savings for subdomains

M=5% savings

N=10% savings $I_1$=Total number of MIL1 questions implemented $I_2$=Total number of MIL2 questions implemented $Q_2$=Total amount of money needed for fully implemented MIL2

$Q_3$=Total amount of money needed for fully implemented MIL3

$S_2$=Total MIL2 savings for a subdomain $S_3$=Total MIL3 savings for a subdomain Therefore, $$X = S_2 + S_3$$

While, $$S_2 = (Q_2 \times (I_1 \times M))$$

$$S_3 = (Q_3 \times ((I_2 \times N) + (I_1 \times M)))$$

The total amount of savings is calculated by finding both the savings of MIL2 and MIL3 separately. To find MIL2 savings ($S_2$), the number of implemented MIL1 questions ($I_1$) are counted and multiplied by 5% (M) to get the total amount of decrease that will be applied to both MIL2 and MIL3 questions. This new percentage is then multiplied by the total cost for a fully implemented subdomain. To find MIL3 savings ($S_3$), the same percentage savings applied to MIL2 is also applied to the total cost it would take to fully implement MIL3, and an additional percent is found by counting the total number of implemented MIL2 questions and multiplying that by 10% (N), then multiplying the new value by the total cost for a fully implemented subdomain. The total savings for a subdomain is found by finding the savings applied to both the MIL2 and the MIL3 questions.

For example, assume in a given subdomain there are 2 MIL1 implementations and there are 3 MIL2 implementations. To calculate the savings, the MIL2 and MIL3 savings each must first be calculated separately. Beginning with MIL2 savings, (2×5%) (for ($I_2$×M)) is equal to 10%, which will be applied to the total cost of fully implementing the subdomain. An example is shown in the following Table 1.

TABLE 1

| DOMAIN/SUBDOMAIN | MIL1 QUESTIONS | MIL2 QUESTIONS | M = 5% | N = 10% | M% + N% | ONLY MIL2 VALUES |
|---|---|---|---|---|---|---|
| IDENTIFY | 8 | 15 | | | | |
| AM | 2 | 2 | 0.1 | 0.2 | 0.3 | 11386.97 |
| BE | 2 | 3 | 0.1 | 0.3 | 0.4 | 7149.96 |
| GV | 1 | 2 | 0.05 | 0.2 | 0.25 | 6752.74 |
| RA | 1 | 5 | 0.05 | 0.5 | 0.55 | 6812.53 |
| RM | 1 | 1 | 0.05 | 0.1 | 0.15 | 5509.82 |
| SC | 1 | 2 | 0.05 | 0.2 | 0.25 | 7894.36 |
| PROTECT | 10 | 17 | | | | |
| AC | 3 | 2 | 0.15 | 0.2 | 0.35 | 11549.56 |
| AT | 2 | 1 | 0.1 | 0.1 | 0.2 | 10330 |
| DS | 3 | 4 | 0.15 | 0.4 | 0.55 | 13762.63 |
| IP | 2 | 8 | 0.1 | 0.8 | 0.9 | 18109.63 |
| MA | 0 | 0 | 0 | 0 | 0 | 3995.98 |
| PT | 0 | 2 | 0 | 0.2 | 0.2 | 9151.58 |
| DETECT | 6 | 6 | | | | |
| AE | 0 | 2 | 0 | 0.2 | 0.2 | 9060.52 |
| CM | 3 | 3 | 0.15 | 0.3 | 0.45 | 13530.38 |
| DP | 3 | 1 | 0.15 | 0.1 | 0.25 | 9664.56 |
| RESPOND | 3 | 8 | | | | |
| RP | 1 | 0 | 0.05 | 0 | 0.05 | 2821.49 |
| CO | 0 | 4 | 0 | 0.4 | 0.4 | 6136.73 |
| AN | 1 | 2 | 0.05 | 0.2 | 0.25 | 6818.59 |
| MI | 1 | 1 | 0.05 | 0.1 | 0.15 | 5995.66 |
| IM | 0 | 1 | 0 | 0.1 | 0.1 | 3068.37 |
| RECOVER | 2 | 3 | | | | |
| RP | 1 | 0 | 0.05 | 0 | 0.05 | 1419.4 |
| IM | 0 | 1 | 0 | 0.1 | 0.1 | 4055.44 |
| CO | 1 | 2 | 0.05 | 0.2 | 0.25 | 6083.16 |
| TOTAL VALUE SAVINGS % COST TO CHANGE FROM NI TO FI | | | | | | |

| DOMAIN/SUBDOMAIN | ONLY MIL3 VALUES | MIL2 SAVINGS | MIL3 SAVINGS | COMBINED SAVINGS |
|---|---|---|---|---|
| IDENTIFY | | | | |
| AM | 16529.47 | 1138.697 | 4958.841 | 6097.538 |
| BE | 10148.33 | 714.996 | 4059.332 | 4774.328 |
| GV | 9802.36 | 337.637 | 2450.59 | 2788.227 |
| RA | 10571.17 | 340.6265 | 5814.1435 | 6154.77 |
| RM | 8081.08 | 275.491 | 1212.162 | 1487.653 |
| SC | 13949.68 | 439.718 | 3487.42 | 3927.138 |
| PROTECT | | | | |

TABLE 1-continued

| | | | | |
|---|---|---|---|---|
| AC | 16020.36 | 1732.434 | 5607.126 | 7339.56 |
| AT | 14203.75 | 1033 | 2840.75 | 3873.75 |
| DS | 19726.44 | 2064.3945 | 10849.542 | 12913.9365 |
| IP | 29974.56 | 1810.963 | 26977.104 | 28788.067 |
| MA | 6260.37 | 0 | 0 | 0 |
| PT | 12297.44 | 0 | 2459.488 | 2459.488 |
| DETECT | | | | |
| AE | 12986.75 | 0 | 2957.35 | 2597.35 |
| CM | 21745.25 | 2029.557 | 9785.3625 | 11814.9195 |
| DP | 12986.75 | 1449.684 | 3246.6875 | 4696.3715 |
| RESPOND | | | | |
| RP | 43263.28 | 141.0745 | 216.314 | 357.3885 |
| CO | 9099.3 | 0 | 3639.72 | 3639.72 |
| AN | 10815.7 | 340.9295 | 2703.925 | 3044.8545 |
| MI | 8793.64 | 299.783 | 1319.046 | 1618.829 |
| IM | 4867.07 | 0 | 486.707 | 486.707 |
| RECOVER | | | | |
| RP | 2281.18 | 70.97 | 114.059 | 185.029 |
| IM | 6083.16 | 0 | 608.316 | 608.316 |
| CO | 5441.05 | 304.158 | 1360.2625 | 1664.4205 |
| | | | | |
| TOTAL VALUE SAVINGS | | | | 111318.36 |
| % COST TO CHANGE FROM NI TO FI | | | | 0.1864 |

Table 1 lists each domain in the first (left) column along with its respective subdomains below each domain, and lists the respective number of MIL1 and MIL2 questions in columns two and three. The column labeled "M=5%" shows all MIL1 questions multiplied by 0.05, respectively. The column "N=10%" shows the number of MIL2 questions multiplied by 0.10. Both of these values are added together in the "M %+N %" column to get a useful value to apply toward MIL3 questions. The column labeled "Only MIL2 Values" and "Only MIL3 Values" are the real working values showing the total amount of credit (e.g., money) allotted to each of the subdomains. The MIL2 values are multiplied by the "M=5%" column to get the "MIL2 Savings," and the MIL3 values are multiplied by the "M %+N %" column to get the "MIL3 Savings." These two savings rows are added in the column labeled "Combined Savings." The summation of "Combined Savings" is shown at the bottom, being a possible total of $111,318.36 credit savings. As shown in the table below the credit savings amount, this number is about 18% of the entire cost to go from not implemented to fully implemented.

Stated more generally, to determine a MIL3 savings in this example, a certain percentage of discount is applied to MIL2 and MIL3 questions depending on the implementation state of the MIL1 questions. Similarly, depending on the implementation state of MIL2 questions, a further discount is applied to MIL3 questions. This discount keeps aggregating. For example, assume a subdomain has two MIL1 questions, one MIL2 question, and one MIL3 question. If one of those two MIL1 questions is fully implemented, a certain percentage of discount is applied to the MIL2 and MIL3 questions. If the other MIL1 question is largely implemented, another percentage of discount is applied on the new cost of the MIL2 and MIL3 questions. Additionally, for example, if MIL2 is largely implemented, then more discount is applied to the MIL3 question. This process calculates an aggregated discount applied on the MIL3 questions, depending on the implementation states of the MIL1 and MIL2 questions. Because a Gaussian distribution is used, the cost per question will change for each play and therefore the discounted value will also change.

Figure 5:
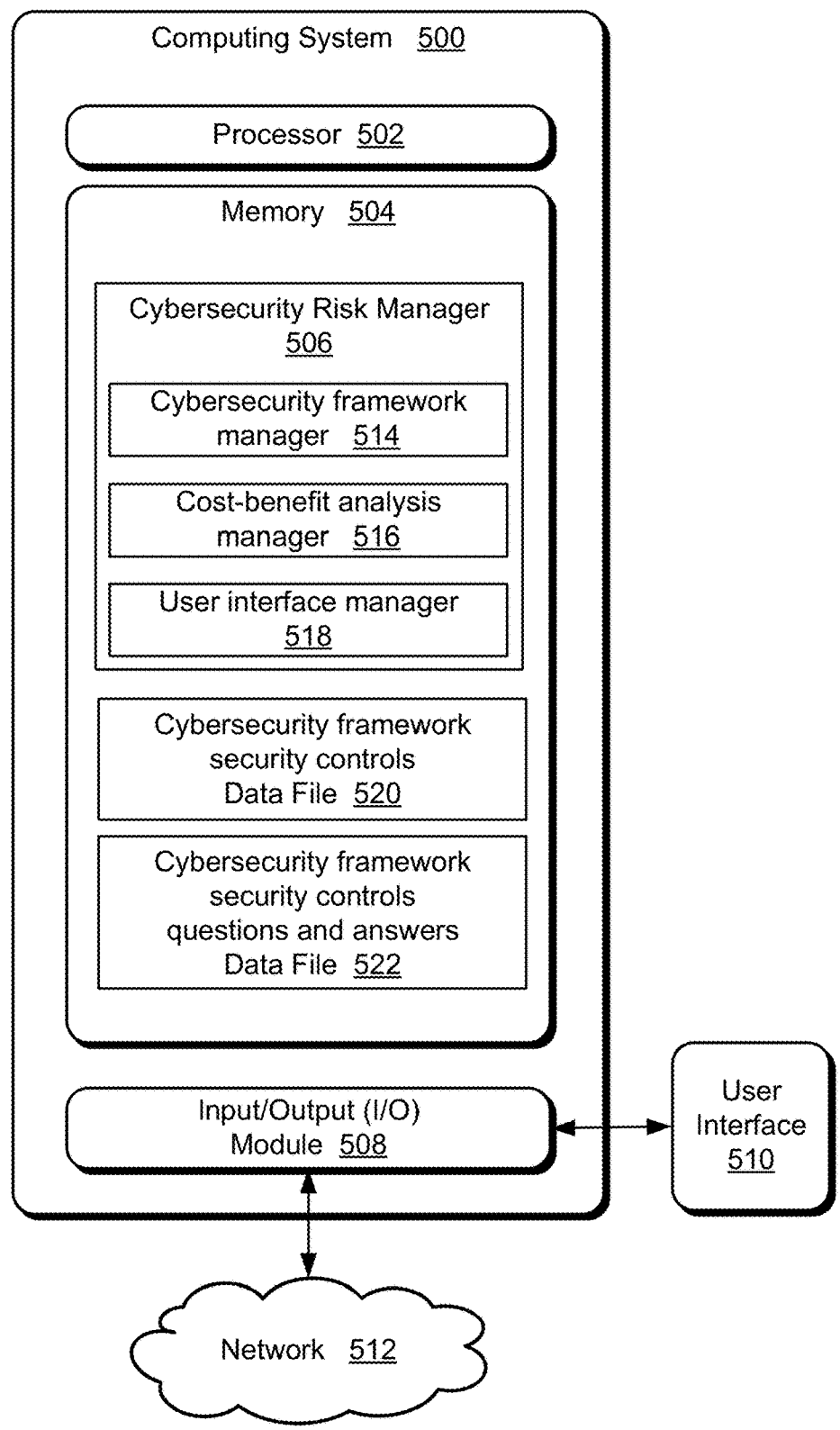
FIG. 5 is a block diagram illustrating an example computing system having a cybersecurity management tool.

FIG. 5 is a block diagram illustrating an example computing system 500 having a cybersecurity risk management tool for cybersecurity vulnerability assessment and correction as described in this disclosure. The computing system 500 includes a processor 502, a computer-readable media (memory) 504, a cybersecurity risk manager 506, and an input/output (I/O) module 508. The computing system communicates with a user interface 510 and a network 512 by way of the I/O module 508. As some non-limiting examples, the computing system 500 may be a server, desktop computer, notebook computer, mobile device, handheld device, mobile phone, or similar computer device. The processor 502 may be any central processing unit (CPU), with one or more cores. The memory 504 may be any non-transitory, machine-readable (e.g., computer/processor-readable) medium, such as a RAM, ROM, cache, SSD, or a combination thereof, for storing program files, data, an operating system, and other executable instructions. The network 512 may be any local area network (LAN), wide area network (WAN), cloud, multi-cloud, hybrid cloud, or private on-premise cloud computing environment. The user interface 510 may be any display, monitor, screen, touch screen, keyboard, mouse, other input or output device, or any combination configuration of these devices to display information from the computing system to a user and allow the user to input information into the system.

The cybersecurity risk manager 506 includes instructions residing in the memory 504 for managing cybersecurity aspects of an entity. These aspects include identifying a general cybersecurity posture of an entity, detecting cybersecurity areas for improvement, providing a cybersecurity lifecycle perspective, a cybersecurity vulnerability assessment, cybersecurity correction guidance, and cybersecurity training. Aspects further include improving the ability to identify, protect, detect, respond, and recover from cyber threats and vulnerabilities to infrastructure, and to prioritize cybersecurity correction plans given some amount of resources. In this example, the cybersecurity risk manager 506 is depicted simply as executable instructions, such as firmware or software, in the memory 504 for execution on the processor 502. However, the operations of the cybersecurity risk manager 506 may be implemented in whole or in part using an ASIC, a system-on-a-chip (SoC), and/or other hardware components either alone or in combination with programming instructions executable by the processor.

The cybersecurity risk manager 506 includes a cybersecurity framework manager 514, cost-benefit analysis manager 516, and user interface manager 518. The cybersecurity framework manager 514 provides functionality to obtain cybersecurity framework security controls from data file 520 or from user input at the user interface 510 via user interface manager 518. The cybersecurity framework manager 514 also provides functionality to categorize the cybersecurity framework security controls into maturity indicator levels, identify an implementation state achieved by an entity with respect to the cybersecurity framework security controls, determine which maturity indicator level represents the implementation state achieved by the entity with respect to each of the cybersecurity framework security controls, and identify a cybersecurity vulnerability of the entity. These functional aspects are more fully described with respect to FIGS. 1A-D.

The cost-benefit analysis manager 516 provides functionality to perform a cost-benefit analysis, using factored weights, for changing cybersecurity implementation states of an entity. For example, the cost-benefit analysis manager 516 obtains a reference value of available credits for addressing cybersecurity issues and distributes the credits across identified cybersecurity domains and subdomains using factored weight formulas as described more fully with respect to FIGS. 3A-D. Whether it be in context of the cybersecurity framework manager 514, or the cost-benefit analysis manager 516, questions posed to a user for an entity regarding any aspects to address these functionalities, and answers received to the questions, are obtained from a user input at the user interface 510 via user interface manager 518, or from a cybersecurity framework security controls questions, and answers data file 522.

While this disclosure has been described with respect to example embodiments outlined above, it is evident that alternatives, modifications, and variations will be apparent to those skilled in the art. Accordingly, the described and depicted embodiments of the present disclosure are intended to be illustrative, not limiting, and the subject of the appended claims is not necessarily limited to the specific features or methods described herein.

What is claimed is:

1. A method of managing cybersecurity of an entity, comprising:
   categorizing, by a computing device, cybersecurity framework security controls, indicative of activities to achieve cybersecurity results, into maturity indicator levels indicative of a progression of maturity for achieving the cybersecurity results;
   identifying, by the computing device, an implementation state achieved by the entity with respect to at least one of the cybersecurity framework security controls;
   determining, by the computing device, which of the maturity indicator levels represents the implementation state achieved by the entity with respect to the at least one of the cybersecurity framework security controls; and
   performing, by the computing device, a cost-benefit analysis for modifying from the implementation state achieved by the entity to a next implementation state to be achieved by the entity with respect to the at least one of the cybersecurity framework security controls, performing the cost-benefit analysis further comprising:
   distributing, using factored weights indicative of a security perspective, a reference value of available credits across a plurality of domains and a plurality of subdomains within which the cybersecurity framework security controls are referenced; and
   distributing the reference value of available credits across the plurality of subdomains using a first Gaussian distribution value relative to the cybersecurity framework security controls as categorized into the maturity indicator levels to achieve a first result value relative to at least one of the maturity indicator levels.

2. The method of claim 1, wherein the categorizing the cybersecurity framework security controls into maturity indicator levels occurs relative to an identified level of implementation requirement associated with the at least one of the cybersecurity framework security controls.

3. The method of claim 2, wherein categorizing the at least one of the cybersecurity framework security controls relative to an identified level of implementation requirement comprises:
   processing at least one of a user input or a data file indicative of the identified level of implementation requirement with respect to the at least one of the cybersecurity framework security controls.

4. The method of claim 1, further comprising:
   categorizing the cybersecurity framework security controls into maturity indicator levels with respect to a plurality of domains and a plurality of subdomains within which the cybersecurity framework security controls apply.

5. The method of claim 1, further comprising:
   categorizing the cybersecurity framework security controls into maturity indicator levels identified from characteristics comprising at least one of:
   (i) practices not performed;
   (ii) practices are performed but may be ad hoc;
   (iii) practices are documented; or
   (iv) practices are guided by policy.

6. The method of claim 1, wherein identifying the implementation state achieved by the entity comprises:
   processing at least one of a user input or a data file indicative of cybersecurity practices implemented by the entity with respect to the at least one of the cybersecurity framework security controls.

7. The method of claim 1 further comprising:
   identifying the implementation state achieved by the entity as being indicative of not implemented, partially implemented, largely implemented, or fully implemented.

8. The method of claim 1 further comprising:
   identifying, by the computing device, with respect to the at least one of the cybersecurity framework security controls, a cybersecurity vulnerability of the entity in an event the implementation state achieved by the entity does not meet a threshold implementation state level.

9. The method of claim 1, further comprising:
   determining an amount of the reference value of available credits required for modifying from the implementation state achieved by the entity to the next implementation state to be achieved by the entity using at least a second Gaussian distribution value of the first result value relative to the cybersecurity framework security controls as categorized into the maturity indicator levels to achieve a second result value relative to the at least one of the maturity indicator levels.

10. The method of claim 9, further comprising:
    determining an amount of the reference value of available credits required for modifying from the implementation state achieved by the entity to the next implementation state to be achieved by the entity using a calculation based on the second result value.

11. A system for managing cybersecurity of an entity, comprising:
a memory device comprising cybersecurity framework security controls indicative of activities to achieve cybersecurity results; and
at least one processor programmed with instructions to:
categorize the cybersecurity framework security controls into maturity indicator levels indicative of a progression of maturity for achieving the cybersecurity results;
identify an implementation state achieved by the entity with respect to at least one of the cybersecurity framework security controls; and
determine a cost-benefit analysis for modifying from the implementation state achieved by the entity to a next implementation state to be achieved by the entity with respect to the at least one of the cybersecurity framework security controls, the cost-benefit analysis comprising factored weights indicative of a security perspective, Gaussian distributions, and the maturity indicator levels, the determination of the cost-benefit analysis further comprising instructions to:
distribute, using the factored weights indicative of a security perspective, a reference value of available credits across a plurality of domains and a plurality of subdomains within which the cybersecurity framework security controls are referenced, and
distribute the reference value of available credits across the plurality of subdomains using a first Gaussian distribution value of the Gaussian distributions relative to the cybersecurity framework security controls as categorized into the maturity indicator levels to achieve a first result value relative to at least one of the maturity indicator levels.

12. The system of claim 11, wherein the at least one processor is further programmed with instructions to categorize the cybersecurity framework security controls relative to an identified level of implementation requirement associated with the cybersecurity framework security controls.

13. The system of claim 11, wherein the at least one processor is further programmed with instructions to perform at least one operation of:
(i) identify the implementation state achieved by the entity by processing at least one of a user input or a data file indicative of cybersecurity practices implemented by the entity with respect to the at least one of the cybersecurity framework security controls, or
(ii) determine which of the maturity indicator levels represents the implementation state achieved by the entity with respect to the at least one of the cybersecurity framework security controls by processing at least one of a user input or a data file indicative of cybersecurity practices implemented by the entity with respect to the at least one of the cybersecurity framework security controls.

14. The system of claim 11, wherein the identified implementation state achieved by the entity is indicative of, with respect to the at least one of the cybersecurity framework security controls, not implemented, partially implemented, largely implemented, or fully implemented.

15. The system of claim 11, wherein the at least one processor is further programmed with instructions to identify, with respect to the at least one of the cybersecurity framework security controls, (i) which of the maturity indicator levels represents the implementation state achieved by the entity with respect to each of the cybersecurity framework security controls, and (ii) a cybersecurity vulnerability of the entity in an event the implementation state achieved by the entity does not meet a threshold implementation state level.

16. The system of claim 11, wherein the at least one processor is further programmed with instructions to determine an amount of the reference value of available credits required for modifying from the implementation state achieved by the entity to the next implementation state to be achieved by the entity using at least one of (i) the Gaussian distributions to generate at least a second Gaussian distribution value of the first result value relative to the cybersecurity framework security controls as categorized into the maturity indicator levels to achieve a second result value, (ii) a calculation based on the second result value, or (ii) a combination thereof.

17. A non-transitory machine-readable storage medium storing instructions that when executed by at least one processor cause the processor to:
categorize a plurality of cybersecurity framework security controls, indicative of activities to achieve cybersecurity results, into maturity indicator levels indicative of a progression of maturity for achieving the cybersecurity results;
identify an implementation state achieved by an entity with respect to the cybersecurity framework security controls; and
calculate a cost-benefit analysis, for modifying from the implementation state achieved by the entity to a next implementation state to be achieved by the entity with respect to at least one of the cybersecurity framework security controls, the cost-benefit analysis comprising factored weights, a Gaussian distribution, and referencing the maturity indicator levels, the calculation of the cost-benefit analysis further comprising instructions causing the processor to,
distribute, using the factored weights indicative of a security perspective, a reference value of available credits across a plurality of domains and a plurality of subdomains within which the cybersecurity framework security controls are referenced, and
distribute the reference value of available credits across the plurality of subdomains using a first Gaussian distribution value of the Gaussian distributions relative to the cybersecurity framework security controls as categorized into the maturity indicator levels to achieve a first result value relative to at least one of the maturity indicator levels.

18. The non-transitory machine-readable storage medium of claim 17, wherein the at least one processor is further programmed with instructions to categorize the cybersecurity framework security controls relative to an identified level of implementation requirement associated with the cybersecurity framework security controls.

19. The non-transitory machine-readable storage medium of claim 17, wherein the at least one processor is further programmed with instructions to perform at least one operation of:
(i) identify the implementation state achieved by the entity by processing at least one of a user input or a data file indicative of cybersecurity practices implemented by the entity with respect to the at least one of the cybersecurity framework security controls, or (ii) determine which of the maturity indicator levels represents the implementation state achieved by the entity with respect to the at least one of the cybersecurity framework security controls by processing at least one of a user input or a data file indicative of cybersecurity practices implemented by the entity with respect to the at least one of the cybersecurity framework security controls.

20. The non-transitory machine-readable storage medium of claim 17, wherein the identified implementation state achieved by the entity is indicative of, with respect to the at least one of the cybersecurity framework security controls, not implemented, partially implemented, largely implemented, or fully implemented.

\* \* \* \* \*